United States Patent [19]

Deffeyes

[11] Patent Number: 4,605,835
[45] Date of Patent: Aug. 12, 1986

[54] FORMING TERMINATIONS OF MLC CAPACITORS

[75] Inventor: Robert J. Deffeyes, Arlington, Tex.

[73] Assignee: Graham Magnetics Incorporated, North Richland Hills, Tex.

[21] Appl. No.: 612,728

[22] Filed: May 21, 1984

[51] Int. Cl.⁴ .......................... B23K 1/19; B23K 26/00
[52] U.S. Cl. .......................... 219/85 BM; 219/85 M; 219/121 LD; 29/25.42
[58] Field of Search .......... 219/85 BA, 85 BM, 85 M, 219/85 R, 121 LC, 121 LD; 29/25.41, 25.42

[56] References Cited

U.S. PATENT DOCUMENTS

| | | |
|---|---|---|
| 3,290,479 | 12/1966 | Avedissian .......................... 219/85 R |
| 4,135,224 | 1/1979 | Maher .......................... 29/25.42 X |
| 4,327,277 | 4/1982 | Daly .......................... 219/121 LD |

*Primary Examiner*—Clarence L. Albritton
*Assistant Examiner*—C. M. Sigda
*Attorney, Agent, or Firm*—Andrew F. Kehoe

[57] ABSTRACT

A process for attaching silver-bearing body electrodes of a multi-layer capacitor blank to a terminating material by using high-intensity heat source to fuse the terminal material to the capacitor blank and body electrode edges exposed on the surface of said blank. A particular advantage is avoidance of silver-migration from the body electrodes.

8 Claims, 1 Drawing Figure

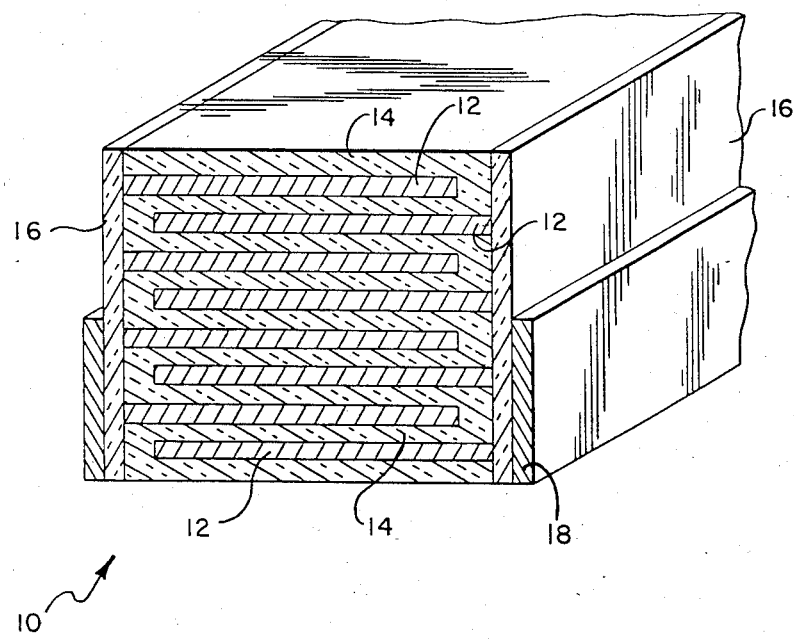

4,605,835

FORMING TERMINATIONS OF MLC CAPACITORS

BACKGROUND OF THE INVENTION

This invention relates to an improved method of manufacturing capacitors, particularly to multiple layer ceramic-type capacitors.

A multiple-layer-ceramic-type capacitor comprises alternating thin layers of body electrode members, usually formed of silver palladium, and dielectric members. Alternate body electrodes typically, are connected to each other at one perimeter of the capacitor to form a positive terminal. The other body electrodes are connected to each other by a small quantity of termination compound at a different perimeter to form a negative terminal. Normally, the termination compound will contain a glass frit or another compound to improve its bonding ability to the capacitor. Most of the termination compound will comprise an electrically conductive metal mass, often a silver-bearing solder, that will readily fuse into an electrical circuit structure when heated to, typically, a 500°–700° C. terminating temperature.

A problem in manufacture of such capacitors has been the tendency of silver to be leached from the electrode into the body of the termination material during the termination process, thus causing infusion or no connections to some electrodes. The problem is one which is not readily controlled and varies in effect depending on the precise processing conditions and the precise nature of the materials being used. Nevertheless, such leaching is a substantial problem in capacitor manufacture of the type using body electrodes comprising a major portion of silver.

The present inventor has directed his attention to the mitigation of the problem. In so doing, he has discovered a primary improvement in the capacitor-terminating art and, also a number of secondary advantages that tend to improve the terminating art still further.

Cited below are some references which were found in a novelty search directed to the present invention. The search necessarily was carried out after the invention was made and with the invention in mind. Citation of these references is no admission that one skilled in the art, faced with the problem to which Applicant directed his attention, would have turned to these references at the time an invention was made.

Lasers have often been used to achieve special advantages in manufacture of electronic components. For example, U.S. Pat. No. 4,442,136 discloses a method for transient annealing of a phosphor coating in formation of AC-driven, thin-film, electroluminescent displays.

The following references describe the use of lasers in the formation of electrical components or circuits: U.S. Pat. No. 3,520,055 to Jannett; U.S. Pat. No. 4,238,661; U.S. Pat. No. 4,229,865. These patents describe cutting (trimming); connecting finished components together; and laser scribing onto the primary surface of a capacitor—another type of trimming operation. U.S. Pat. No. 4,327,277 describes the use of a laser in connecting an already-manufactured, multi-layer-ceramic capacitor, i.e. a capacitor already terminated (with apparently pre-existing "termination bands") and already containing a part-terminating solder layer for connection to a circuit. Similarly, in U.S. Pat. No. 4,439,814, Rhodes describes delayed trimming of a finished, circuit-mounted capacitor. In contrast to the above, the process described herein will relate to the field of manufacturing capacitors and to the avoidance of certain physical-chemical problems related precisely to the capacitor manufacturing step whereby a termination is attached to the capacitor chip.

SUMMARY OF THE INVENTION

A principal object of the present invention is to provide an improved process for terminating multi-layer ceramic capacitors by substantial elimination of the tendency to leach a noble metal from the thin-layer body electrodes of the capacitor.

A further object of the invention is to provide a terminating process using a higher-temperature solder means, one having a lesser tendency to promote solder leaching and, especially, diffusion of silver from a body electrode.

Another object of the invention is to provide a thermal terminating step which requires no substantial coating or heating time cycle during manufacture.

An additional object of the invention is to provide a process for making multi-layer ceramic capacitors of more precisely-predictable geometry, thereby increasing the yield of such capacitors which may be suitably coated or packaged for applications requiring said coatings or packaging.

Other objects of the invention will be obvious to those skilled in the art on their reading of this disclosure.

The above objects have been substantially achieved by using a pulse of rapid, high-temperature, radiation to achieve a quick fusion of electrode termination materials on a multi-layer capacitor. The heat is so highly-localized that it will be terminated before silver in, say, a high-silver, low-palladium body electrode can become sufficiently mobile to migrate out of the electrode into the terminating composition before said silver-bearing body electrode can be heated to a temperature at which any substantial quantity of silver may diffuse out from the body electrode into the terminating compositon. This is true even when the terminating composition contains little or no silver, i.e. when the potential for migration is relatively high. Thus termination compounds with higher fusing temperatures may be suitably used; although, in practice, it is usually more desirable to select a material with the lowest fusion temperature suitable for a given product.

The problems associated with the heating of the body electrode are amplified as one attempts to make thinner body electrodes, e.g. body electrodes of about 150 microinches in thickness or less. The smaller cross-section tends to reduce any flow of heat down the electrode and, consequently, tends to further endanger the quality of that portion of the electrode nearer to the termination. Thus, it has become even more important to address the problem of silver leaching as the electrodes become thinner.

The precisely-predictable terminating characteristics of the process of the invention have made possible a still further advance in the art. The termination material can be pre-coated onto a transfer web, as in small, geometrically-predefined, labels and then stamped onto the appropriate side of the capacitor blank with great precision after which the laser-assisted fusion to the blank can be carried out. This procedure not only minimizes the use of expensive conductive compound but it allows the metering of a precise amount, e.g. the smallest amount required, of terminating material. Substantial amounts of material may be saved when the safety-factors necessary for the processes of the prior art become unnecessary in use of the invention. Precise control of the termination electrode size and shape produces capacitors with controlled dimensions. This is a very desirable feature for automatic insertion equipment. This, too, reduces the amount of sensible heat which is available for transfer to the body electrode. As discussed above, this becomes particularly important when very thin body electrodes are used.

DEFINITIONS

In this application a body electrode is that portion of a multi-layer ceramic capacitor which is a conductive layer sandwiched between two dielectric layers and attached at a perimeter to a termination which will unite several alternating body electrodes into a single device electrode. Body electrodes at present, are usually silver-bearing, and often formed of a palladium silver mixture. They must be able to withstand very high—say 1100° C. to 1400° C.—processing temperature.

A termination material is the material which connects several alternating body electrodes into a single device electrode. A capacitor will ordinarily have two device electrodes which may be called terminations. A termination material will usually contain an adhesive-promoting component. A glass frit material is most commonly used as an adhesive-promoting component. The termination material should be solder-compatible in that it does not resist, and advantageously promotes, the subsequent solder connection of a termination to other circuit components. In some cases, the termination material itself can serve a dual purpose—i.e. it can be used both as an electrode and as a solder. Indeed, this type of versatility is faciliated by the strict control of flow made possible by the present invention. In general, termination materials must withstand much lower processing temperatures than do body electrode materials. The present invention, however, allows a wider choice of materials to be used for a given application. Higher temperature materials can be fired with much reduced danger of silver leach and lower temperature materials can be safely fired with better control and with an overall rapidity which maximizes the convenience of using such materials. Also, of course, there is the need for less silver, or no silver, in the terminations because the tendency for silver migration is small enough that it need not be opposed by a substantial reduction in the gradient between the concentration of silver in the body electrode and the concentration of silver in the terminal materials. In some cases small amounts of silver, e.g. about 5%, previously have been used in solder to oppose silver migration from body electrodes.

A broad range of termination compounds may be used with the process of the invention. For example, even compounds which are applied at above 800° C. may be used. The latter can be processed without excess thermal inertia which would cause overheating of the chip. On the other hand, the control of the radiation-type process is sufficiently precise that the process is suitable with a broad range of solders, even with solders which are solderable below 300° C.

In addition to the preferred laser energy source, it is practical to utilize radiation from high-intensity heat sources, e.g. from a high-powered electronic flash source. When such flashes are used, it is desirable to process the energy through a proper focussing system (an optical system or, at least, a reflecting surface) to achieve the desired intensity of energy at the suitable position on the capacitor body being processed. However, another means of transmitting the energy would be through a heated element brought into very close proximity to the material to be heated and thereupon heated to a temperature suitable to achieve the desired radiation.

ILLUSTRATIVE EMBODIMENT OF THE INVENTION

In this application and accompanying drawings there is shown and described a preferred embodiment of the invention and suggested various alternatives and modifications thereof, but it is to be understood that these are not intended to be exhaustive and that other changes and modifications can be made within the scope of the invention. These suggestions herein are selected and included for the purposes of illustration in order that others skilled in the art will more fully understand the invention and the principles thereof and will be able to modify it and embody it in a variety of forms, each as may be best suited to the condition of a particular case.

IN THE DRAWINGS

The drawing is a schematic viewed in perspective of capacitor of the type to which the invention relates.

As seen in the drawing, a capacitor 10 is formed of silver palladium body electrodes 12 of about 160 micro-inch thickness and a dielectric material 14 (e.g. barium titantate-based ceramic material as is known in the art). The end termination composition is stamped on as two 3-mil sheet cut-outs 16. Solder is transfer stamped on as 6-mil thick sheets 18 of tin-lead solder know to the art.

The laser-firing process of the invention is primarily related to the rapid heating of the terminal strips, thereby attaching them to the sides of the capacitor formed by the edges of the body electrodes and the dielectric barrier layers.

It is also to be understood that the following claims are intended to cover all of the generic and specific features of the invention herein described and all statements of the scope of the invention which might be said to fall therebetween.

What is claimed is:

1. A process for attaching a plurality of silver-based body electrodes of a multi-layer-ceramic capacitor blank to a conductive terminating material said process comprising the steps of
   (a) placing a predetermined amount of fusible terminating material along exposed edges of said body electrodes,
   (b) using a high-intensity radiation heat source to heat said terminating material to its fusing temperature, thereby adhering said terminating material to said exposed edges of said body electrodes, and
   (c) terminating said heating so that said terminating material cools before said silver-based body electrodes can be heated to a temperature whereat any substantial quantity of silver may diffuse out from said body electrode into said terminating material.
2. A process as defined in claim 1 wherein said terminating material initially contains no silver.
3. A process as defined in claim 1 wherein said terminating material contains 0 to 5% of silver.
4. A process as defined in claim 1 wherein said terminating material fuses onto a capacitor body at temperature above 800° C.

5. A process as defined in claim 1 wherein said terminating material is a material which is solderable at a temperature below 300° C.

6. A process as defined in claim 1 wherein the body electrodes are less than about 150 microinches thick.

7. A process as defined in claim 1 wherein the high-intensity radiation heat source is a high powered electronic flash.

8. A process as defined in claim 1 wherein the high-intensity radiation heat source is provided by close proximity or contact with a heated strip of metal or other material.

* * * * *